United States Patent [19]

Hackney

[11] 4,302,869
[45] Dec. 1, 1981

[54] HAND PULLER FOR ROPES

[76] Inventor: John Hackney, 1026 NW. 16th St., Stuart, Fla. 33494

[21] Appl. No.: 150,084

[22] Filed: May 15, 1980

[51] Int. Cl.³ .............................................. F16G 11/04
[52] U.S. Cl. .................................. 24/115 R; 24/130; 294/1 R
[58] Field of Search ..................... 294/1 R, 25, 26, 92, 294/86 R, 114; 16/114 R; 24/115 R, 129 R, 129 A, 129 B, 129 D, 130, 136 R, 264; 104/202, 222, 225; 114/218, 221 R; 182/133, 136

[56] References Cited

U.S. PATENT DOCUMENTS 690,246 12/1901 Diepold ............................ 24/115 R
3,715,782 2/1973 Newell ............................ 114/218 X
3,744,098 7/1973 Bowers ............................ 24/136 R
3,956,785 5/1976 Halfon ............................ 114/218 X

FOREIGN PATENT DOCUMENTS 61336 7/1912 Switzerland ......................... 24/130
21740 of 1905 United Kingdom ................ 114/218

Primary Examiner—Johnny D. Cherry
Attorney, Agent, or Firm—Carroll F. Palmer

[57] ABSTRACT

A device to assist in the hand pulling of ropes comprises a handle portion and a rope cleating portion attached to the handle portion and having a wedge section to grasp a rope inserted therein.

1 Claim, 13 Drawing Figures

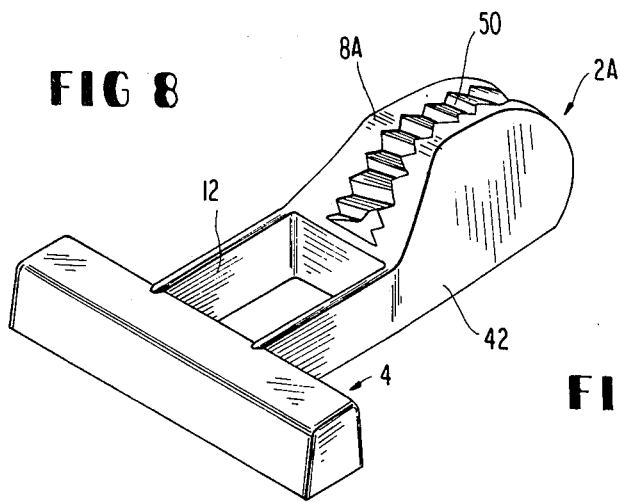
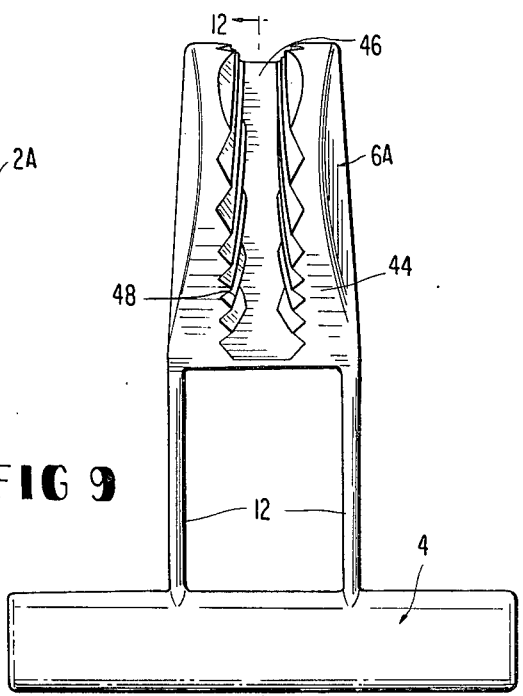
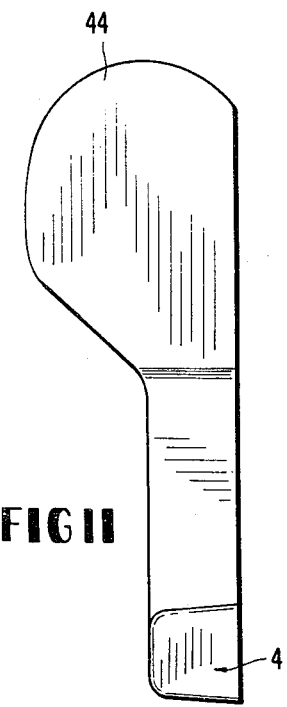
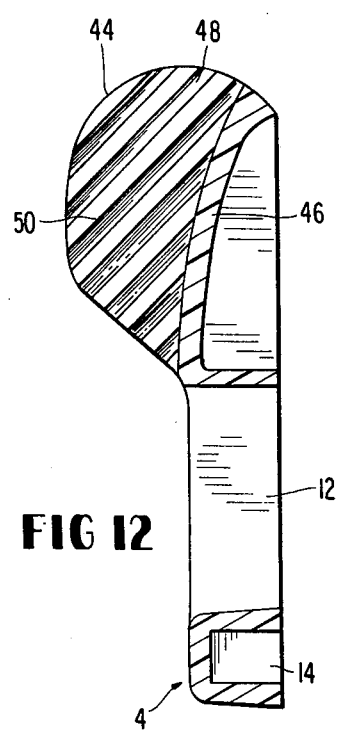
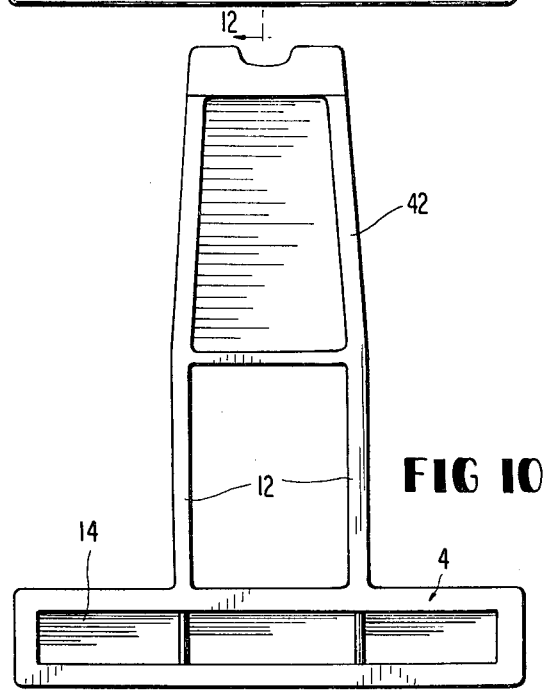
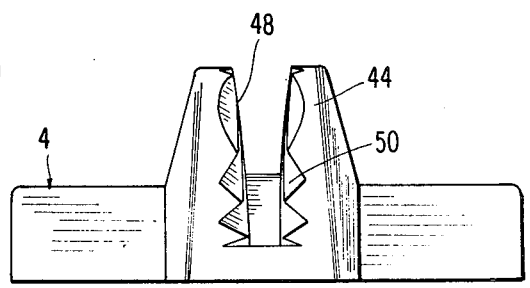

HAND PULLER FOR ROPES

BACKGROUND OF THE INVENTION

1. Field of the Invention

Broadly the invention relates to rope pulling devices. More specifically, it concerns devices that a person may hold in a hand to grasp a rope to assist in rapid, forceful pulling of the rope.

2. Description of the Prior Art

Numerous devices exist to help pull ropes, cables or other lines. These vary from simple, hand-held items to more complicated equipment such as winches and windlass machines. This invention concerns improvements in the simple, hand-held type of rope puller.

It is frequently necessary to rapidly pull a length of rope through a sheave or the like to move a weight or other item attached to the other end of the rope. Usually the task requires that strong tension be applied to the rope and also that the rope move rapidly. A primative way for increasing tension in the hand pulling of a rope is to wrap the rope around a hand, pull the rope a short distance, unwrap the rope to move the hand forward on the rope, rewrap and repull and repeat this until the required length of rope has been pulled. The wrapping and unwrapping slows down the operation and can bruise the puller's hand. This invention concerns rope pullers that permit maximum tension to be applied to the rope while increasing the speed with which the rope is pulled.

The rope pullers of the invention include a wedge section that grasps a rope inserted therein. It is known in the art to use wedge members to grasp or cleat ropes, e.g., see U.S. Pat. No. 3,956,785.

OBJECTS

A principal object of this invention is the provision of improvements in hand pullers for ropes.

A further object is the provision of simple, hand-held rope pullers that enable a person to pull a rope at relatively high speed and with substantially greater tension than would be possible with bare hands.

Other objects and further scope of applicability of the present invention will become apparent from the detailed description given hereinafter; it should be understood, however, that the detailed description while indicating preferred embodiments of the invention, is given by way of illustration only, since various changes and modifications within the spirit and scope of the invention will become apparent to those skilled in the art from this detailed description.

SUMMARY OF THE INVENTION

These objects are accomplished according to the present invention by providing a rope pulling device comprising a handle portion and a rope cleating portion attached to the handle portion. The cleating portion comprises a wedge section that will tightly grasp a rope inserted therein when the device is moved to tension the rope, but allows the rope to be easily released when the device is moved to release tension on the rope.

Preferably, the handle portion of the rope puller comprises a bar and a pair of parallel, spaced-apart strips integral with and perpendicular to the bar.

The wedge section of the rope cleating portion may be formed in a variety of ways. In one form, it comprises a triangular slot in a web member that bridges the strips of the handle portion. In another form, it comprises a pair of tapered lugs that provide a V-shaped opening in which the rope is cleated.

BRIEF DESCRIPTION OF THE DRAWINGS

A more complete understanding of the invention may be had by reference to the accompanying drawings in which:

FIG. 8 is an isometric view of another embodiment of a rope puller of the invention.

FIG. 9 is an anterior view of the puller of FIG. 8.

FIG. 10 is a posterior view of the puller of FIG. 8.

FIG. 11 is a lateral view of the puller of FIG. 8.

FIG. 12 is a sectional view taken on the line 12—12 of FIG. 9.

FIG. 13 is an end view of the puller of FIG. 8.

DESCRIPTION OF THE PREFERRED EMBODIMENTS

Figure 1:
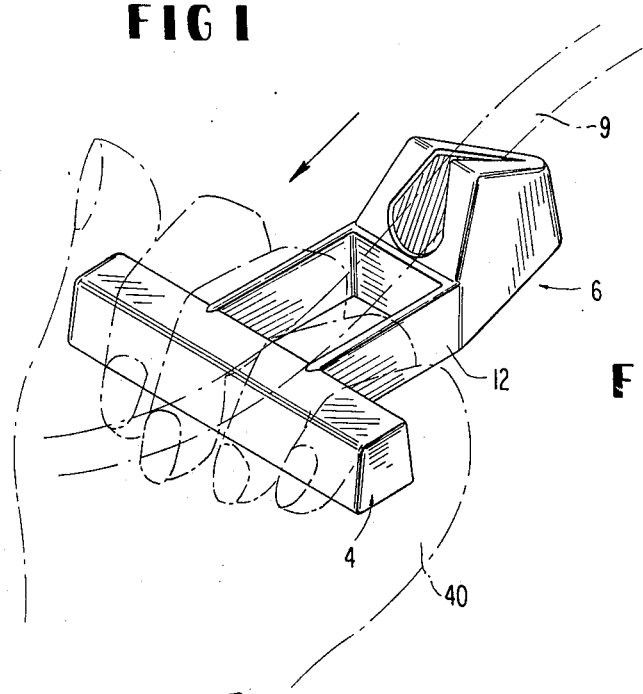
FIG. 1 is a perspective view of a rope puller of the invention showing in phantom line how the puller is used.
Figure 2:
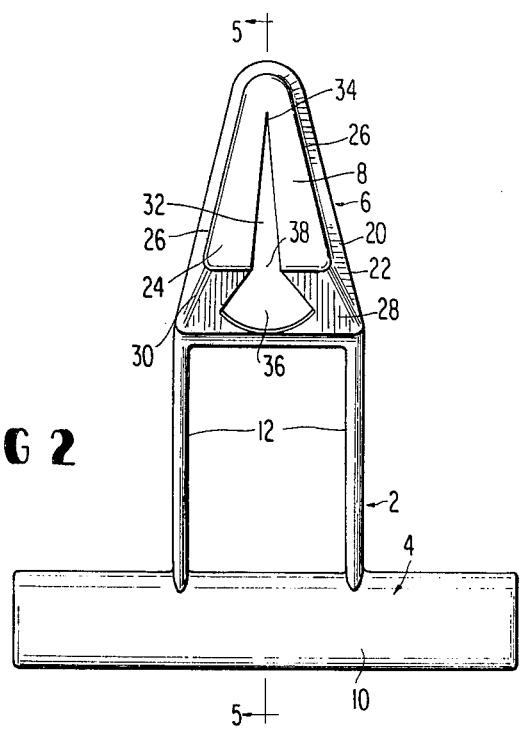
FIG. 2 is an anterior view of the puller of FIG. 1.
Figure 4:
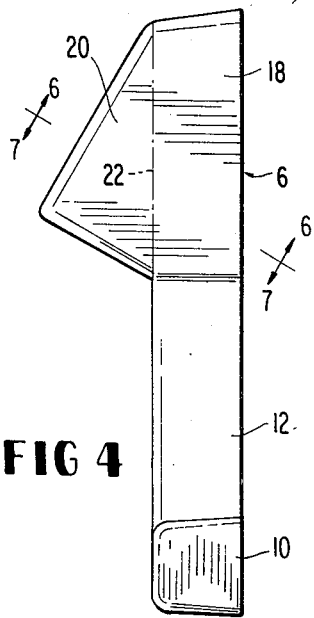
FIG. 4 is a lateral view of the puller of FIG. 1.
Figure 5:
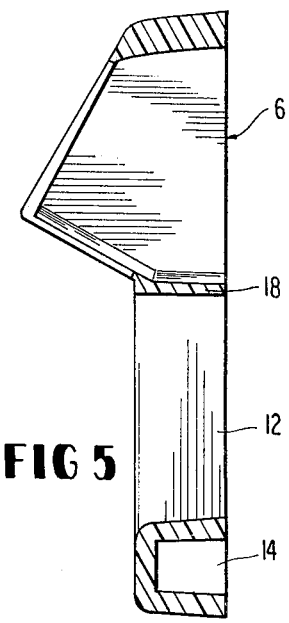
FIG. 5 is a sectional view taken on the line 5—5 of FIG. 2.
Figure 3:
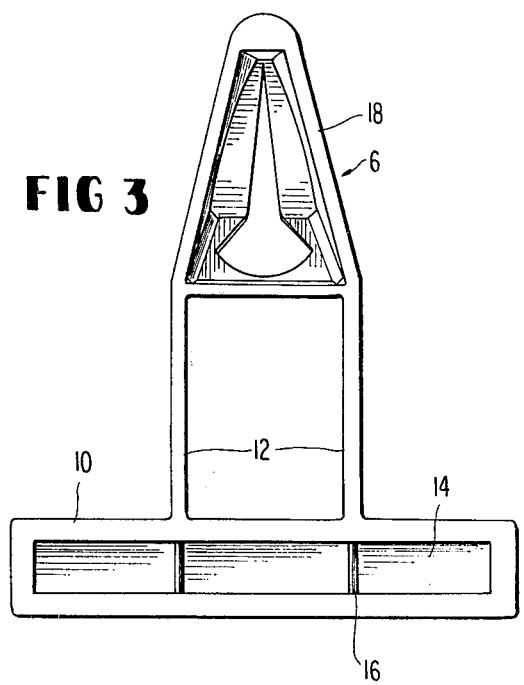
FIG. 3 is a posterior view of the puller of FIG. 1.
Figure 6:
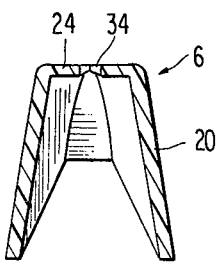
FIG. 6 is a sectional view taken on the line 6—6 of FIG. 4.
Figure 7:
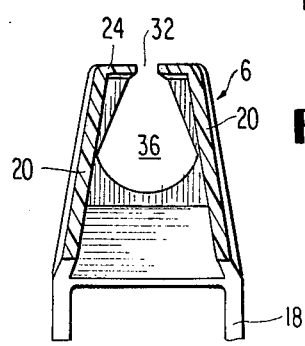
FIG. 7 is a sectional view taken on the line 7—7 of FIG. 4.

Referring in detail to the drawings, the rope pulling device 2 comprises a handle portion 4 and a rope cleating portion 6 which has a wedge section 8 to grasp a rope 9 inserted therein.

The handle portion 4 consists of a bar 10 and a pair of parallel, spaced-apart strips 12 integral with and perpendicular to the bar 10. In order to reduce the mass of the bar 10 without harming its strength, the bar is formed such as by injection molding of high strength plastic, with recesses or hollows 14 and cross-ribs 16.

The rope cleating portion 6 comprises a triangular base section 18, a pair of right-angled triangular sides 20 integral with the base 18 along the hypotenuse 22. A triangular web 24 extends between and integral with the upper pair of legs 26 of the sides 20. A trapezoidal web 28 extends between and integral with the other pair of legs 30 of the sides 20.

A triangular slot 32 is formed in the web 24 with its apex 34 distal to the handle 4. There is an arcuate opening 36 in the web 28 that joins to the slot 32 at its base 38.

The method of use of the rope puller 2 is illustrated by FIG. 1. The handle portion 4 is grasped in the hand 40 of the user and rope 10 is inserted into the slot 32 of the cleating portion 6. When tension is applied to the rope by pulling in the direction indicated by the arrow in FIG. 1, the wedge section 8 serves to grasp or cleat the rope enabling the user to pull the rope to the full extent possible with the users arm. At this point, the other hand of the user (not shown) is used to grasp the rope and hold it at a steady position. The rope puller 2 is then moved in the opposite direction to the arrow in FIG. 1 thereby relieving tension applied to the rope by the rope puller 2. This permits the rope 9 to be released by the wedge section 8, whereupon the puller 2 may be advanced further along the rope 9. The rope at the advanced point is then reinserted in the wedge section 8 and the pulling, stop, release and reposition operation is repeated until the desired length of rope has been moved.

Instead of using the puller 2 to move a long length of rope through a sheave, or the like, the puller 2 may be used to tighten short lengths of rope, e.g., lacing extending between pieces of canvass, etc.

The embodiment of the rope puller 2A shown in FIGS. 8–13 has the same basic features as the puller of FIG. 1, namely, a handle portion 4, and a rope cleating portion 6A which has a wedge section 8A.

The handle portion 4 with strips 12 is substantially identical to the puller 2 of FIG. 1. The difference is in the wedge section 8A.

The rope cleating portion 6A comprises a longitudinal base section 42 and a pair of space-apart lugs 44 extending perpendicular from one surface 46 of the base section 42. The inside surfaces 48 of the lugs 44 taper outwardly from the base section 42 forming a V-shaped wedge section 8A. The inside surfaces 48 have a series of parallel serrations 50 therein that extend at an acute angle relative to the base section 42.

The method of use of the rope puller 2A is comparable to that described for rope puller 2. In use, a rope (not shown in FIG. 8) will be intermittently grasped or cleated by the wedge section 8A to tension and/or advance the rope. Such operation can be accomplished quickly without damage to the hands of the user of the puller and with much greater tension being applied to the rope than is possible with bare hands.

The embodiments of the invention in which an exclusive property or privilege is claimed are defined as follows:

1. A rope pulling device comprising a handle portion and a rope cleating portion attached to said handle portion, said rope cleating portion comprising a triangular base section, a pair of right-angled triangular sides integral with said base section along the hypotenuse thereof, a triangular web extending between the upper pair of legs of said triangular sides, a trapezoidal web extending between the other pair of legs of said triangular sides, a triangular slot in said triangular web the apex of which is distal to said handle portion and an opening in said trapezoidal web that joins to said triangular slot at the base thereof.

* * * * *